(12) United States Patent
Croxford et al.

(10) Patent No.: US 9,182,934 B2
(45) Date of Patent: Nov. 10, 2015

(54) METHOD AND APPARATUS FOR GENERATING AN OUTPUT SURFACE FROM ONE OR MORE INPUT SURFACES IN DATA PROCESSING SYSTEMS

(71) Applicant: ARM LIMITED, Cambridge (GB)

(72) Inventors: Daren Croxford, Cambridge (GB); Tom Cooksey, Cambridge (GB); Lars Ericsson, Cambridge (GB)

(73) Assignee: ARM Limited, Cambridge (GB)

( * ) Notice: Subject to any disclaimer, the term of this patent is extended or adjusted under 35 U.S.C. 154(b) by 211 days.

(21) Appl. No.: 14/032,481

(22) Filed: Sep. 20, 2013

(65) Prior Publication Data

US 2015/0084982 A1    Mar. 26, 2015

(51) Int. Cl.
G09G 5/00       (2006.01)
G06F 3/14       (2006.01)
G06F 3/01       (2006.01)

(52) U.S. Cl.
CPC . *G06F 3/14* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 5,181,131 A | 1/1993 | Yamazaki et al. | |
| 5,241,656 A | 8/1993 | Loucks et al. | |
| 5,686,934 A | 11/1997 | Nonoshita et al. | |
| 6,069,611 A | 5/2000 | Flynn et al. | |
| 6,075,523 A | 6/2000 | Simmers | |
| 6,304,606 B1 | 10/2001 | Murashita et al. | |
| 6,825,847 B1 | 11/2004 | Molnar et al. | |
| 7,190,284 B1 | 3/2007 | Dye et al. | |
| 7,671,873 B1 | 3/2010 | Pierini et al. | |
| 8,254,685 B2 | 8/2012 | Greene et al. | |
| 2002/0036616 A1 | 3/2002 | Inoue | |

(Continued)

FOREIGN PATENT DOCUMENTS

| | | |
|---|---|---|
| EP | 1 035 536 A2 | 9/2000 |
| EP | 1 484 737 A1 | 12/2004 |

(Continued)

OTHER PUBLICATIONS

Bergsagel, Jonathan, et al., "Super high resolution displays empowered by the OMAP4470 mobile processor: WUXGA resolution tablets now becoming a reality for the Android ecosystem", Texas Instruments, Dallas, Texas, 2012, pp. 1-16.

(Continued)

*Primary Examiner* — Phi Hoang
*Assistant Examiner* — Mohammad H Akhavannik
(74) *Attorney, Agent, or Firm* — Nixon & Vanderhye P.C.

(57) ABSTRACT

In a data processing system, an output surface, such as frame to be displayed, is generated as a plurality of respective regions with each respective region of the output surface being generated from a respective region or regions of one or more input surfaces. When a new version of the output surface is to be generated 80, for each region of the output surface it is determined which region or regions of the input surface or surfaces contribute to the region of the output surface 84 and then checked whether the contributing region or regions of the input surface or surfaces have changed since the previous version of the output surface region was generated 85. If there has been a change in the contributing region or regions of the input surface or surfaces since the previous version of the region in the output surface was generated 86, the region of the output surface is regenerated 87.

22 Claims, 11 Drawing Sheets

(56) References Cited

U.S. PATENT DOCUMENTS

| | | | |
|---|---|---|---|
| 2003/0080971 | A1 | 5/2003 | Hochmuth et al. |
| 2004/0141613 | A1 | 7/2004 | Hayashi |
| 2005/0168471 | A1 | 8/2005 | Paquette |
| 2005/0285867 | A1 | 12/2005 | Brunner et al. |
| 2006/0152515 | A1 | 7/2006 | Lee et al. |
| 2006/0188236 | A1 | 8/2006 | Kitagawa |
| 2007/0005890 | A1 | 1/2007 | Gabel et al. |
| 2007/0083815 | A1 | 4/2007 | Delorme et al. |
| 2007/0146380 | A1 | 6/2007 | Nystad et al. |
| 2007/0188506 | A1 | 8/2007 | Hollevoet et al. |
| 2007/0257925 | A1 | 11/2007 | Brunner et al. |
| 2007/0261096 | A1 | 11/2007 | Lin et al. |
| 2008/0059581 | A1 | 3/2008 | Pepperell |
| 2008/0143695 | A1 | 6/2008 | Juenemann et al. |
| 2009/0033670 | A1 | 2/2009 | Hochmuth et al. |
| 2009/0202176 | A1 | 8/2009 | Hwang et al. |
| 2010/0058229 | A1 | 3/2010 | Mercer |
| 2010/0332981 | A1 | 12/2010 | Lipton et al. |
| 2011/0074765 | A1 | 3/2011 | Oterhals et al. |
| 2011/0074800 | A1 | 3/2011 | Stevens et al. |
| 2011/0102446 | A1 | 5/2011 | Oterhals et al. |
| 2012/0092451 | A1 | 4/2012 | Nystad et al. |
| 2012/0176386 | A1 | 7/2012 | Hutchins |
| 2012/0206461 | A1 | 8/2012 | Wyatt et al. |
| 2012/0268480 | A1* | 10/2012 | Cooksey et al. ............... 345/619 |
| 2012/0293545 | A1* | 11/2012 | Engh-Halstvedt et al. ... 345/629 |
| 2013/0067344 | A1* | 3/2013 | Ungureanu et al. .......... 715/740 |

FOREIGN PATENT DOCUMENTS

| | | |
|---|---|---|
| JP | 63-298485 | 12/1988 |
| JP | 05266177 A | 3/1992 |
| JP | 11-355536 | 12/1999 |
| WO | WO 2008/026070 | 3/2008 |

OTHER PUBLICATIONS

Khan, Moinul H., et al., "Bandwidth-efficient Display Controller for Low Power Devices in Presence of Occlusion", Consumer Electronics, ICCE 2007, Digest of Technical Papers, International Conference on Jan. 10-14, 2007 (2 pages).
Park, Woo-Chan, et al., "Order Independent Transparency for Image Composition Parallel Rendering Machines", P.-C. Yew and J. Xue (Eds.): A CSA 2004, LNCS 3189, pp. 449-460.
Heade, T., et al., "HDR Image Composition and Tone Mapping on the Cell Processor", MSc Interactive Entertainment Technology, Trinity College Dublin, Graphic Vision and Visualisation GV2 group (8 pages).
"Quick look at the Texas Instruments TI OMAP 4470 CPU, Kindle Fire HD CPU", Arctablet News, 2014 Arctablet Blog, pp. 1-7.
"Composition Processing Cores (CPC)", http://www.vivantecorp.com/index.php/en/technology/composition.html.
U.S. Appl. No. 12/588,459, of Oterhals et al., filed Oct. 15, 2009.
U.S. Appl. No. 12/588,461, of Stevens et al., filed Oct. 15, 2009.
U.S. Appl. No. 12/923,518, of Oterhals et al., filed Sep. 24, 2010.
U.S. Appl. No. 13/435,733, of Oterhals et al., filed Mar. 30, 2012.
Combined Search and Examination Report, Jul. 27, 2012 in United Kingdom application No. GB1205846.7.
XDamage Extension, http://www.freedesktop.org/wiki/Software/XDamage/?action=print, last edited May 18, 2013, 2 pages.
Creating a polygon shape from a 2d tile array, mhtml://X:\Documents and Settings\jtothill.DEHNS.002\Local Settings\Temporar . . . , last edited Oct. 5, 2009, 3 pages.
Android-eepc / base, https://gitorious.org/android-eepc/base/source/ . . . , 2007 ©, 9 pages.
"Qt source code", 2013 ©, 264 pages https://qt.gitorious.org/qt/qt/source/427e398a7b7f3345fb4dcbc275b3ea29f211851b:src/gui/kernel/qwidget.cpp.
EGL (OpenGL), http://en.wikipedia.org/wiki/EGL_(OpenGL), last edited Sep. 21, 2012.
U.S. Appl. No. 12/923,517, filed Sep. 24, 2010; Inventor: Croxford et al.
U.S. Appl. No. 13/898,510, filed May 21, 2013; Inventor: Croxford et al.
Office Action mailed Feb. 21, 2012 in U.S. Appl. No. 12/588,459, pp. 1-29.
Office Action mailed Feb. 21, 2012 in U.S. Appl. No. 12/588,461, pp. 1-29.
Office Action mailed Aug. 29, 2012 in U.S. Appl. No. 12/588,459, pp. 1-29.
Office Action mailed Jan. 22, 2013 in U.S. Appl. No. 12/588,459, pp. 1-20.
Office Action mailed Jun. 20, 2013 in U.S. Appl. No. 12/588,459, pp. 1-26.
Office Action mailed Jul. 2, 2013 in U.S. Appl. No. 12/588,459, pp. 1-24.
Office Action mailed Feb. 17, 2012 in U.S. Appl. No. 12/588,461, pp. 1-20.
Office Action mailed Aug. 30, 2012 in U.S. Appl. No. 12/588,461, pp. 1-22.
Office Action mailed Jun. 5, 2013 in U.S. Appl. No. 12/588,461, pp. 1-20.
Office Action mailed Dec. 3, 2013 in U.S. Appl. No. 12/588,461, pp. 1-18.
Office Action mailed Nov. 8, 2013 in U.S. Appl. No. 12/923,518, pp. 1-18.
Office Action mailed Nov. 21, 2013 in U.S. Appl. No. 12/923,517, pp. 1-21.
Shim et al., *A Compressed Frame Buffer to Reduce Display Power Consumption in Mobile Systems*, IEEE, Asia and South Pacific Design Automation Conference (ASP-DAC'04) pp. 1-6.
Shim, *Low-Power LCD Display Systems*, School of Computer Science and Engineering, Seoul National University, Korea.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
Chamoli, Deduplication—A Quick Tutorial, Aug. 8, 2008, http://thetoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
United Kingdom Search Report in United Kingdom Application No. GB 0916924.4, Jan. 15, 2010.
UK Combined Search and Examination Report dated Jan. 26, 2011 in GB 1016162.8.
UK Combined Search and Examination Report dated Jan. 26, 2011 in GB 1016165.1.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Systems, Aug. 12-14, 2002, Monterey, California, pp. 112-117.
Iyer et al., Energy-Adaptive Display System Designs for Future Mobile Environments, HP Laboratories Palto Alto, Apr. 23, 2003.
Carts-Powell, Cholesteric LCDs Show Images After Power is Turned Off; OptoIQ, Sep. 1, 1998.
Zhong et al., Energy Efficiency of Handheld Computer Interfaces Limits, Characterization and Practice.
Patel et al., Frame Buffer Energy Optimization by Pixel Prediction, Proceedings of the 2005 International Conference on Computer Design, Jun. 2005.
R. Patel et al., Parallel Lossless Data Compression on the GPU, 2012 IEEE, 10 pages, in Proceedings of Innovative Parallel Computing (InPar '12). May 13-14, 2012. San Jose, California.
Smalley, ATI's Radeon X800 Series Can Do Transparency AA Too, Sep. 29, 2005.
Esselbach, Adaptive Anti-Aliasing on ATI Radeon X800 Boards Investigated, Oct. 17, 2005.
Digital Visual Interface DVI, Revision 1.0, Digital Display Working Group, Apr. 2, 1999, pp. 1-76.

(56) References Cited

OTHER PUBLICATIONS

Ma, OLED Solution for Mobile Phone Subdisplay, Apr. 2003.
Z. Ma et al., Frame Buffer Compression for Low-Power Video Coding, 2011 18$^{th}$ IEEE International Conference on Image Processing, 4 pages, Date of conference: Sep. 11-14, 2011.
M. Weinberger et al., The LOCO-I Lossless Image Compression Algorithm: Principles and Standardization into JPEG-LS, pp. 1-34; Published in: Image Processing, IEEE Transactions on . . . (vol. 8, Issue 8), Aug. 2000.
T.L. Bao Yng et al., Low Complexity, Lossless Frame Memory Compression Using Modified Hadamard Transform and Adaptive Golomb-Rice Coding, IADIS International Conference Computer Graphics and Visualization 2008, Jul. 15, 2008, pp. 89-96.
A.J. Penrose, Extending Lossless Image Compression, Technical Report No. 526, Dec. 2001, pp. 1-149.
M. Ferretti et al., A Parallel Pipelined Implementation of LOCO-I for JPEG-LS, 4 pages; Date of conference: Aug. 23-26, 2004.
Jbarnes' braindump :: Intel display controllers; Jan. 26, 2011; http://virtuousgeek.org/blog/index.php/jbarnes/2011/01/26/intel_display_controllers; 5 pages, Jan. 26, 2011.
Office Action mailed Dec. 20, 2013 in U.S. Appl. No. 13/435,733, pp. 1-29.
Japanese Office Action issued in Japanese Patent Application No. 2010-213509 dated Jun. 23, 2014 (w/translation)—7 pages.
U.S. Appl. No. 14/255,395, filed Apr. 17, 2014, Croxford et al.
Japanese Office Action mailed Apr. 7, 2014 in Japanese Application No. 2010-213508.
Intel Buffer Compression (http://virtuousgeek.org/blog) Jan. 2011, 5 pages.
Arctablet (http://www.arctablet.com/blog . . . ) 2010, 12 pages.
Final Rejection mailed Jul. 2, 2013 in co-pending U.S. Appl. No. 12/588,459.
Office Action mailed Dec. 20, 2013 in co-pending U.S. Appl. No. 13/435,733.
U.S. Office Action issued in U.S. Appl. No. 13/435,733 dated Jun. 17, 2014.
U.S. Office Action issued in U.S. Appl. No. 12/588,461 dated Jul. 22, 2014.
Final Rejection mailed Feb. 24, 2015 in co-pending U.S. Appl. No. 12/588,461.
Non-final Rejection mailed Dec. 26, 2014 in co-pending U.S. Appl. No. 12/923,518.
Vesa Digital Packet Video Link Standard, Video Electronics Standards Association, Version 1, Apr. 18, 2004, 86 pages.
Office Action mailed Mar. 24, 2015 in U.S. Appl. No. 13/898,510, 35 pages.
Office Action mailed Apr. 2, 2015 in U.S. Appl. No. 13/435,733, 39 pages.
Final Office mailed Jul. 29, 2015 in co-pending U.S. Appl. No. 13/898,510 28 pages.
Final Office mailed Aug. 7, 2015 in co-pending U.S. Appl. No. 12/923,518 27 pages.

* cited by examiner

METHOD AND APPARATUS FOR GENERATING AN OUTPUT SURFACE FROM ONE OR MORE INPUT SURFACES IN DATA PROCESSING SYSTEMS

BACKGROUND

The technology described herein relates to a method of and an apparatus for generating an output surface (such as a window to be displayed) from one or more input surfaces (such as input windows) in data processing systems.

Many known electronic devices and systems use windows for displaying information, such as a graphical user interface, game, demo, etc., to a user on a display screen (and for allowing a user to interact with an application or applications being executed). A common way of displaying such windows is to use a so-called compositing window system, in which the individual windows are first stored in (rendered to) respective window buffers, and then the individual window buffers (i.e. their content) are combined appropriately into a unified frame buffer for the display in question in order to display the windows to the user. In this arrangement, the individual input windows will accordingly form one or more input surfaces that are then combined by the compositing window system into an output surface (the unified frame buffer) for display.

While such compositing window systems are generally believed to be preferable to systems where each window is rendered to the frame buffer directly, they can still require significant resources in terms of memory bandwidth, processing and power consumption.

Studies have shown that with mobile device use, most of the time (around 75%) is spent on User Interface (UI) generation and composition, whereas around 15% is spent on basic 3D apps and 3D composition and the remaining 10% is spent on less basic 3D apps and games and their composition.

Composition uses a significant amount of memory bandwidth and power. For example, a study has shown that 2,179 MB/s is consumed for an Android type application for HD resolutions in many systems.

The Applicants believe that there remains scope for improvements to arrangements, such as compositing window systems, in which an output surface is generated from one or more input surfaces.

BRIEF DESCRIPTION OF THE DRAWINGS

A number of embodiments of the technology described herein will now be described by way of example only and with reference to the accompanying drawings, in which.

Like reference numerals are used for like features throughout the drawings, where appropriate.

DETAILED DESCRIPTION

Figure 1:
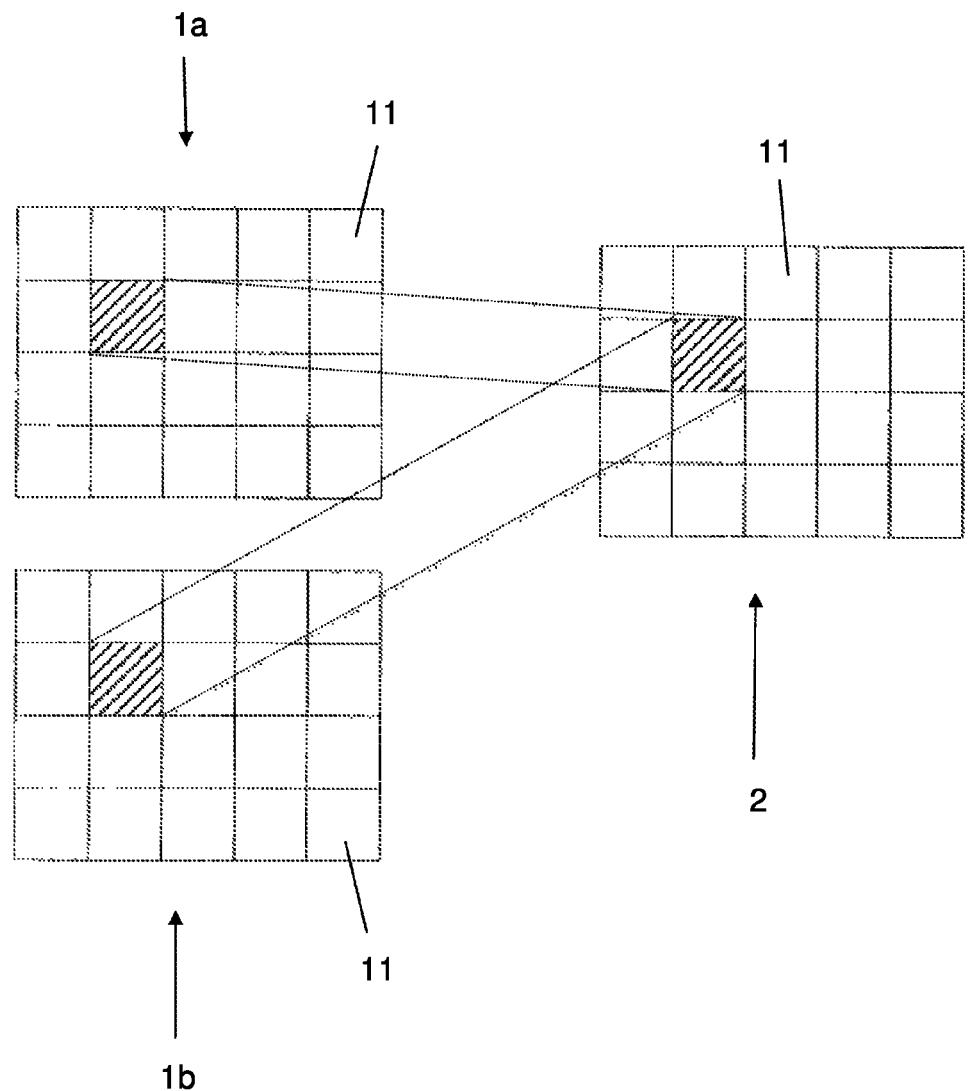
FIG. 1 is a schematic diagram illustrating the mapping of two input surfaces onto a single output surface.

A first embodiment of the technology described herein comprises a method of generating an output surface from one or more input surfaces in a data processing system, the method comprising:

generating the output surface as a plurality of respective regions that together form the output surface, each respective region of the output surface being generated from a respective region or regions of one or more input surfaces; and when a new version of the output surface is to be generated, for at least one region of the output surface:

(i) determining which region or regions of the input surface or surfaces contribute to the region of the output surface;

(ii) checking whether the contributing region or regions of the input surface or surfaces have changed since the previous version of the output surface region was generated; and (iii) if there has been a change in the contributing region or regions of the input surface or surfaces since the previous version of the region in the output surface was generated, regenerating the region of the output surface.

A second embodiment of the technology described herein comprises an apparatus for generating an output surface from one or more input surfaces in a data processing system, the apparatus comprising:

memory that stores one or more input surfaces to be used to generate an output surface; and processing circuitry configured to generate an output surface as a plurality of respective regions that together form the output surface, each respective region of the output surface being generated from a respective region or regions of one or more of the input surfaces; wherein:

the processing circuitry is further configured to, when a new version of the output surface is to be generated:

for at least one region of the output surface, determine which region or regions of the input surface or surfaces contribute to the region of the output surface;

check whether the contributing region or regions of the input surface or surfaces have changed since the previous version of the output surface region was generated; and if there has been a change in the contributing region or regions of the input surface or surfaces since the previous version of the region in the output surface was generated, regenerate the region of the output surface.

The technology described herein relates to arrangements in which an output surface, such as a frame to be displayed in a compositing window system, is generated by generating respective regions of the output surface from respective regions of one or more input surfaces (such as application windows in a compositing window system). However, when a new version of the output surface is to be generated, it is first determined which region(s) of an input surface or surfaces contribute to (i.e. will be used to generate) a region of the output surface in question, and checked whether the contributing region or regions of the input surface(s) have changed since the region of the output surface was last generated. Then, if there has been a change in the contributing region or regions of the input surface(s), the region of the output surface is regenerated.

The Applicants have recognised that in, for example, compositing window systems, most of the time the majority of the user interface for the composition frames are unaltered, such that the majority of the final output frame may be unchanged as between successive output frames. This could then mean that much of the bandwidth and power used to recompose the final output frame is in fact unnecessary. The technology described herein addresses this by determining whether the regions of the input surfaces contributing to a given region of the output surface have changed, before the region of the output surface is regenerated when a new version of the output surface (e.g. frame) is to be generated.

Moreover, the technology described herein determines which region or regions of the input surface or surfaces contribute to the region of the output surface in question before checking whether those input region or regions have changed (such that the output region should then be regenerated). This allows the technology described herein to, in particular, take account of the situation where a given region of the output surface will in fact be formed from (using) two or more (a plurality of) input surface regions.

Also, as will be discussed further below, this allows the technology described herein to, inter alia, take account of situations in which the input surface or surfaces may be scaled when being used to generate regions of the output surface. For example, the technology described herein can take account of situations in which, for example, there is a 1:n and/or n:1 mapping of regions between the input surface or surfaces and the output surface and also as between the input surface and the output surface as a whole.

The Applicants have recognised that in compositing window systems, for example, some input surfaces that are to be composited may be scaled. For example, the output of a video engine may be scaled into a window in the GUI (Graphical User Interface). The technology described herein, by first determining which region or regions of the input surface or surfaces contribute to a region of the output surface allows such scaling to be taken account of when generating the output surface.

The input surface or surfaces and the output surface may be any suitable and desired such surfaces. As will be appreciated from the above, in one embodiment the technology described herein is used in a compositing window system, and so the input surface or surfaces are an input window or windows (to be displayed), and the output surface is an output frame (composited window) for display.

Correspondingly, in an embodiment, the data processing system is a system for displaying windows, e.g. for a graphical user interface, on a display, and, in an embodiment, a compositing window system.

However, other arrangements would be possible. For example, the output surface could be some intermediate window that is then itself to be composed with other windows into a final output window (frame) for display, or the output surface could, e.g. be some form of data structure, such as a graphics texture, that is intended to be used in further, e.g., graphics, processing.

In an embodiment, the input and output surfaces are all images, e.g. frames for display. The output surface is, in an embodiment, stored for use once it has been generated. In an embodiment it is displayed.

The input surfaces can be generated as desired, for example by being appropriately rendered and stored into a buffer by a graphics processing system (a graphics processor), as is known in the art. In a compositing window system, the input surface windows may be, e.g., for a game, a demo, a graphical user interface, etc., as is known in the art.

The output surface can correspondingly be generated from the input surface or surfaces as desired, for example by blending or otherwise combining the input surfaces. The process can also involve applying transformations (skew, rotation, scaling, etc.) to the input surface or surfaces, if desired. This process can be performed by any appropriate component of the data processing system, such as a graphics processor, as is known in the art.

There may only be one input surface that is being used to generate the output surface, but, in an embodiment, there are plural (two or more) input surfaces that are being used to generate the output surface. In this case, the operation in the manner of the technology described herein will comprise determining which regions of each of two or more input surfaces contribute to a region of the output surface and then checking whether the contributing regions of the input surfaces have changed since the previous version of the output surface region was generated.

There may only be a single region from an (or from each) input surface that contributes to the output surface region, or there may be two or more regions of the, or of one or more of the, input surfaces that contribute to the output surface region.

It will be appreciated that the technology described herein is particularly applicable to arrangements in which a succession of output surfaces, e.g. frames to be displayed, are generated from a succession of input surfaces (that may, e.g., remain the same, or vary over time (and, in an embodiment, this is the case)). Thus the technology described herein, in an embodiment, comprises generating a succession of output surfaces, and when each new version of the output surface is to be generated, carrying out the operation in the manner of the technology described herein. Thus, in an embodiment the process of the technology described herein is repeated for plural versions of a given output surface that are being generated (and as they are generated), and, in an embodiment, as each successive new version of the output surface is generated.

The regions of the input and output surfaces that are considered and used in the technology described herein can each represent any suitable and desired region (area) of the surface in question. So long as the surface in question is able to be divided or partitioned into a plurality of identifiable smaller regions each representing a part of the overall surface that can be identified and processed in the manner of the technology described herein, then the sub-division of the surfaces into regions can be done as desired.

In embodiments, the regions correspond to respective blocks of data corresponding to respective parts of the overall array of data that represents the surface in question (as is known in the art, the surfaces will typically be represented as, and stored as, arrays of sampling position or pixel data).

All the surfaces can be divided into the same size and shape regions (and in an embodiment this is done), or, alternatively, different surfaces could be divided into different sized shapes and regions (for example the input surface or surfaces could use one size and shape region, whereas the output surface could use another size and shape region).

The region size or sizes that are used may also depend upon the process whereby the input surfaces are combined to generate the output surface (for example if there is any form of scaling as between the input surface or surfaces and the output surface).

Each surface region (e.g. block of data) in an embodiment may represent a different part (region) of the surface (data overall array) (although the regions could overlap if desired). Each region (data block) should ideally represent an appropriate portion (area) of the surface (data array), such as a plurality of data positions within the surface. Suitable region sizes could be, e.g., 8×8, 16×16 or 32×32 data positions in the surface data array.

In some embodiments, the surfaces are divided into regularly sized and shaped regions (e.g. blocks of data), which, in an embodiment, are in the form of squares or rectangles. However, this is not essential and other arrangements could be used if desired.

In some embodiments, each surface region corresponds to a rendered tile that a graphics processor or video engine that is rendering (generating) the surfaces produces as its rendering output. This is a particularly straightforward way of implementing the technology described herein, as the graphics processor will generate the rendering tiles directly, and so there will be no need for any further processing to "produce" the surface regions that will be considered in the manner of the technology described herein.

Additionally, in such cases, when the processor is generating the input surface regions (tiles). it can also generate a signature for each region (tile) at the same time as the region (tile) data. If the processor is generating a composited rendered output region (tile), it will be working on regions and so will work well with embodiments which include looking at signatures of the input surface regions (tiles). Also, the processor may generate and store a signature for the composited rendered output region (tile). This would be useful if the output surface is later to be used as an input surface, for example.

(As is known in the art, in tile-based rendering, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (regions) are each rendered separately (typically one after another). The rendered tiles (regions) then form the complete output array (frame) (render target), e.g. for display.

Other terms that are commonly used for "tiling" and "tile based" rendering include "chunking" (the regions are referred to as "chunks") and "bucket" rendering. The terms "tile" and "tiling" will be used herein for convenience, but it should be understood that these terms are intended to encompass all alternative and equivalent terms and techniques.)

In these arrangements of the technology described herein, the (rendering) tiles that the surfaces are divided into for rendering purposes can be any desired and suitable size or shape. The rendering tiles in some embodiments are all the same size and shape, as is known in the art, although this is not essential. In some embodiments, each rendered tile is rectangular (including square), and, in some embodiments, 8×8, 16×16, 32×32, 32×4 or 32×1 sampling positions in size. Non-square rectangular regions, such as 32×4 or 32×1 may be better suited for output to a display.

In some embodiments, the technology described herein is also or instead performed using surface regions of a different size and/or shape to the tiles that the rendering process operates on (produces).

For example, in some embodiments, the surface regions that are considered in the manner of the technology described herein may be made up of a set of plural "rendering" tiles, and/or may comprise only a sub-portion of a rendering tile. In these cases there may be an intermediate stage that, in effect, "generates" the desired surface regions from the rendered tile or tiles that the graphics processor generates.

The regions of the input surface or surfaces that contribute to (i.e. will be used to generate) the region of the output surface in question (and that should then be checked in the manner of the technology described herein) can be determined as desired. In one embodiment this is done based on the process (e.g. algorithm) that is to be used to generate the region of the output surface from the region or regions of the input surface or surfaces. For example, the determination may be based on the compositing algorithm (process) that is being used. A compositing algorithm may specify how (e.g. size, position and/or orientation) an input window (surface) is displayed in the output frame (surface).

In another embodiment, a record is maintained of the input surface region or regions that contributed to (have been used to generate) each respective output surface region, and then that record is used to determine which region or regions of the input surface or surfaces contribute to the region of the output surface in question. The record may, for example, comprise data, such as meta data, representing which region or regions of the input surface or surfaces contribute to a region of the output surface. The data may specify a list of coordinates or other labels representing the region or regions, for example.

In this case, a record could be maintained, for example, of those input surface regions that contribute to the output surface region (and in an embodiment this is done), or the record could indicate the input surface regions that do not contribute to the output surface region.

In another embodiment, the input surface regions that contribute to an output surface region are determined based on the process that is being used to generate the output surface region (i.e. algorithmically), but a record is also maintained indicating if any of the so-determined surfaces do not in fact contribute to the output surface region (and so do not need to be checked for the purposes of the technology described herein (and then those indicated surfaces are not checked)).

Thus, in an embodiment, a record is maintained of those input surface regions that the process that is being used to generate the output surface region would use, but that will not in fact (in practice) contribute to the output surface region, and it is then determined which input surface regions contribute to the output surface region by removing (subtracting) the input surface regions in the record from the set of input surface regions that the process that is being used to generate the output surface region will use. This may be more appropriate, for example, where the list of non-contributing input surface regions is relatively short compared to the list of contributing input surface regions.

In some embodiments, the step of determining which region or regions of the input surface or surfaces contribute to the region of the output surface includes first determining which input surface or surfaces contribute to the region of the output surface, and then determining which region or regions of that input surface or those input surfaces contribute to the region of the output surface.

In some embodiments, the step of determining which region or regions of the input surface or surfaces contribute to the region of the output surface includes first determining which version of the input surface or surfaces contribute to the region of the output surface.

The step of checking whether the determined contributing region or regions of the input surface or surfaces have changed since the previous version of the output surface region was generated can be performed in any desired and suitable manner.

The checking of whether a contributing region of an input surface has changed since the previous version of the output surface region was generated is, in an embodiment, performed by comparing the current version of the region of the input surface (i.e. that will be used to generate the new version of the output surface region to be generated) with the version of the region of the input surface that was used to generate the previous version of the output surface region (to see if the input surface region has changed).

In these arrangements, the comparison of the current version of the input surface region with the version of the input surface region that was used to generate the previous version of the output surface region should be so as to determine whether the new version is the same as (or at least sufficiently similar to) the previous version or not. This can be done in any suitable and desired manner. Thus, for example, some or all of the content of the current input surface region may be compared with some or all of the content of the previously used input surface region (and in some embodiments this is done).

In embodiments, the comparison is performed by comparing information representative of and/or derived from the content of the current version of the input surface region in question with information representative of and/or derived from the content of the version of that input surface region that was used to generate the previous version of the output surface region, e.g., and in some embodiments, to assess the similarity or otherwise of the input surface regions.

The information representative of the content of the input surface regions is in some embodiments in the form of information representative of the content of each surface region (e.g. rendered tile). This information for each input surface region (e.g. rendered tile) may take any suitable form, but is in some embodiments based on or derived from the content of the respective input surface region. In embodiments, it is in the form of a "signature" for the input surface region which is generated from or based on the content of the input surface region (e.g. the data block representing the input surface region). Such a region content "signature" may comprise, e.g., and in some embodiments, any suitable set of derived information that can be considered to be representative of the content of the region, such as a checksum, a CRC, or a hash value, etc., derived from (generated for) the data for the input surface region. Suitable signatures would include standard CRCs, such as CRC32, or other forms of signature such as MD5, SHA-1, etc.

Thus, in embodiments, a signature indicative or representative of, and/or that is derived from, the content of each input surface region is generated for each input surface region that is to be checked, and the checking process comprises comparing the signatures of the respective input surface regions (in embodiments to determine whether the signatures representing the respective versions of the input surface region in question has changed since the current version of the output surface region was generated).

Thus, in some embodiments, when the system is operating in the manner of the technology described herein, a signature, such as a CRC value, is generated for respective regions for the input surface or surfaces (e.g. and in an embodiment, for each input surface region, e.g. rendered tile, that is generated for the input surface or surfaces). Any suitable "signature" generation process, such as a CRC function or a hash function, can be used to generate the signature for a region.

The signatures for the input surface regions (e.g. rendered tiles) should ideally be stored appropriately, and associated with the regions of the input surfaces to which they relate. In some embodiments, they are stored with the input surfaces in the appropriate, e.g., window, buffers. Then, when the signatures need to be compared, the stored signature for a region may be retrieved appropriately.

The checking process may, e.g., require an exact match for an input surface region to be considered not to have changed, or only a sufficiently similar (but not exact) match, e.g., that exceeds a given threshold, could be required for the region to be considered not to have changed.

The signature generation, where used, may be implemented as desired. For example, it may be implemented in an integral part of the graphics processor that is generating (rendering) the input surfaces, or there may, e.g., be a separate "hardware element" that is intermediate the graphics processor and the buffer where the surfaces are stored.

A (re)generated output surface may later be used as an input surface. Thus, as an output surface region is being (re)generated, in some embodiments this step may include generating, and, in some embodiments, storing, a signature for the output surface region.

The input surface region checking process may similarly be implemented as desired. For example, an application and/or a window compositor could carry out this process.

As will be appreciated, it should be, and in embodiments is, checked whether each respective contributing input surface region to be checked has changed since the previous version of the output surface region was generated. Thus, in embodiments, for each input surface region that it has been determined will contribute to the output surface region and so should be checked to see if it has changed, the current version of that input surface region is compared (e.g., and, in embodiments, by means of a signature comparison process) to the version of that input surface region that was used to generate the previous version of the output surface region, to see if the input surface region has changed.

Correspondingly where there are two or more input surfaces that contribute to the output surface, the determined contributing regions in each input surface will be checked (and if there has been a change in the contributing region or regions of any of the input surfaces since the previous version of the output surface region was generated, then the region of the output surface will be regenerated).

In an embodiment, if the number of input surface regions that contribute to an output surface region exceeds a particular, in embodiments selected, in embodiments predetermined, threshold number, then rather than checking whether any of the input surface regions have changed, the output surface region is simply regenerated without performing any check as to whether any of the input surface regions have changed. Each input surface region list (i.e. a list of input surface regions that contribute to an output surface region) may only be allocated a limited amount of memory so, for example, in the case that 256B is provided per list, the threshold could be 128 regions.

Similarly, in an embodiment, if the number of input surfaces that contribute to a given output surface region exceeds a particular, in an embodiment selected, in an embodiment predetermined threshold number, then again the output surface region is in an embodiment simply regenerated without first checking whether any of the input surface regions have changed. Each input surface list (i.e. list of input surfaces that contribute to an output surface region) may only be allocated a limited amount of memory so, for example, in the case that 256B is provided per list, the threshold could be 128 surfaces. The method may comprise considering the probability of one of the input surface regions changing between regenerations of the output surface. For example, the probability that at least one of the input surface regions will have changed could be considered, and if this probability exceeds a given threshold value then again the output surface region is in an embodiment simply regenerated without first checking whether any of the input surface regions have changed. This may be appropriate where the input surface comprises video content.

In these arrangements, the respective output surface regions for which the input surface regions will not be checked, may, e.g., be marked, e.g. in metadata, as not to be checked (and thus simply to be regenerated for the next version of the output surface).

These arrangements allow the input surface checking process to be omitted in situations where, for example, that process may be relatively burdensome, for example because of the number of input surface regions that need to be checked.

In these arrangements, where a record is maintained of the input surface regions that contribute to a given output surface region, then correspondingly where the number of input surface regions that contribute to a given output surface region exceeds the threshold value, in an embodiment the record of the input surface regions that contribute to the output surface region is not maintained (is not stored) for the output region in question. This again accordingly sets a cap on the amount of data that could need to be stored for identifying which input surface regions contribute to a given output surface region.

In an embodiment, as well as or instead of (and, in an embodiment, as well as) comparing respective input surface regions to determine whether they have changed, it is also possible to perform the comparison for larger areas of an input surface, for example, for areas that encompass plural regions of the input surface, and/or for the input surface as a whole.

In this case, in an embodiment, content representing signatures are also generated and stored for the respective larger areas (e.g. for the entire input surface) of the input surface that could be considered.

In such an embodiment, when the number of regions from a given input surface that contribute to an output region exceeds a particular, in an embodiment selected, in an embodiment predetermined, threshold number of input surface regions, then instead of comparing each input region individually to determine if it has changed, a larger area of the input surface, e.g. the input surface as a whole, is, in an embodiment, compared to determine if it has changed, and then a decision as to whether the individual surface regions have changed is made accordingly. Thus, for example, in one embodiment, when the number of regions from an input surface that contribute to an output surface region exceeds a threshold value, rather than checking if each input region surface has changed individually, a determination is made as to whether the input surface as a whole has changed (and then the output surface region regenerated if it is determined that the input surface as a whole has changed).

In these arrangements, the threshold for checking whether larger areas of the input surface has changed instead of individual regions of the input surface could be the same as, or different to, the threshold value for aborting the checking process entirely. In an embodiment, there are at least two threshold numbers of input surface regions that contribute to an output surface region that are checked, a first, lower threshold number of input surface regions that triggers checking whether a larger area of the input surface has changed, and then a second, higher number of input surface regions that triggers simply regenerating the output surface region without performing any check as to whether the input surface regions could have changed.

In an embodiment it is determined whether any input surface regions that should be used to generate to the output surface region will not be visible in the output surface region, and then only the input surface regions which will be visible in the output surface region are considered to be input surface regions that will contribute to the output surface region and so checked to see if they have changed. Input surface regions may not be visible in an output surface region because, for example, they are behind other opaque input surfaces that occlude them.

In an embodiment, this process accordingly comprises determining whether any of the input surfaces having regions that would be used to generate an output surface region will be occluded by other input surfaces that have regions that will be used to generate the output surface region (and if so, not checking whether the regions in the occluded input surface have changed or not).

Accordingly, in an embodiment, it is determined whether any of the input surfaces having regions that will be used to generate the output surface region lie behind and are completely covered by opaque regions of another input surface that will be used to generate the output surface region. This check could simply determine whether there is a nearer opaque input surface that completely covers the input surface in question, or it could, e.g., be performed by considering respective regions of the input surfaces, as desired.

Thus, in an embodiment, it is determined which region or regions of an (and of each) input surface that is to be used to generate the output surface region will be visible in the output surface region in question, and the check as to whether the input surface regions are changed is only performed for those input surface regions that it has been determined will be visible in the output surface region. This avoids performing any redundant processing for input surface regions which will not in fact be visible in the output surface region.

In an embodiment, if any transformation that is applied to an input surface whose regions contribute to an output surface region changes, then the output surface region is regenerated. This straightforwardly allows for the fact that any change in the transformation being applied to an input surface region that contributes to an output surface region is likely to mean that the output surface region will change.

In one embodiment, this is implemented such that if any of the contributing input surfaces has/have been transformed since the output surface was last generated, the region (and, in some embodiments, all of the regions) of the output surface are regenerated. For example, if any of the one or more input surfaces have been re-sized, moved, rotated and/or brought forwards or backwards in a display hierarchy of multiple overlapping surfaces, then, in embodiments, the region(s) of the output surface are regenerated (and, in embodiments, the whole output surface is regenerated).

In one embodiment, the method comprises, if an input surface has been transformed since the output surface was last generated, determining which region or regions of the output surface are altered (e.g. changed or affected) as a consequence of or by the transformed input surface and then regenerating that region or those regions of the output surface. Thus, only the region or regions of the output surface which are affected by a transformed input surface need to be regenerated, rather than the whole output surface.

Similarly, if the front to back ordering of the contributing input surfaces changes, then, in embodiments, the region(s) of the output surface are regenerated (and, in an embodiment, the whole output surface is regenerated).

Equally, in an embodiment, if the set of input surfaces that contribute to the output surface and/or if the set of input surfaces that contribute to the output surface region changes, then, in an embodiment, the region(s) of the output surface are regenerated (and, in an embodiment, the whole output surface is regenerated).

Similarly, if the set of input surface regions that contribute to the output surface region changes, then the output surface region is, in an embodiment, regenerated.

While it would be possible, for example, to check whether any of the contributing input surfaces has been transformed on an output surface region by output surface region basis, in an embodiment, it is determined whether any of the input surfaces that will be used to generate the output surface has been transformed since the output surface was last generated before determining for at least one output surface region the input surface region or regions that contribute to the output surface region, and then checking whether those contributing input surface regions have changed.

If any of the contributing input surfaces has been transformed, the output surface is, in an embodiment, then regenerated as a whole (without determining for at least one output surface region the input surface region or regions that contribute to the output surface region, and then checking whether those contributing input surface regions have changed), but if the contributing input surfaces have not been transformed, then the process of determining for at least one output surface region the input surface region or regions that contribute to the output surface region, and then checking whether those contributing input surface regions have changed or not is performed.

In other words, it is, in an embodiment, first checked whether any of the contributing input surfaces has been transformed for the output surface as a whole, and the process of determining for at least one region of the output surface, which region or regions of the input surface or surfaces contribute to the region of the output surface and then checking whether any of those contributing regions have changed is only performed if it is determined that none of the contributing input surfaces has been transformed.

Similarly, it is, in an embodiment, first checked for the output surface as a whole whether the front to back ordering of the contributing input surfaces has changed since the output surface was last generated, and if so, the output surface is, in an embodiment, then regenerated as a whole (without determining for at least one output surface region the input surface region or regions that contribute to the output surface region, and then checking whether those contributing input surface regions have changed), but if the front to back order of the contributing input surfaces has not changed, then the process of determining for at least one output surface region the input surface region or regions that contribute to the output surface region, and then checking whether those contributing input surface regions have changed or not is performed.

Similarly, it is, in an embodiment, first checked for the output surface as a whole whether the set of input surfaces that contribute to the output surface has changed since the output surface was last generated for the output surface as a whole, and if so, the output surface is, in an embodiment, then regenerated as a whole (without determining for at least one output surface region the input surface region or regions that contribute to the output surface region, and then checking whether those contributing input surface regions have changed), but if the set of contributing input surfaces has not changed, then the process of determining for at least one output surface region the input surface region or regions that contribute to the output surface region, and then checking whether those contributing input surface regions have changed or not is performed.

In some embodiments, the system is configured to always regenerate each output surface region periodically, e.g., once a second, and/or once every particular, e.g., selected, number of versions of the output surface (e.g. every certain number of output frames). This will then ensure that each output surface region is regenerated at least at a minimum, selected period of time. This may thereby avoid, e.g., erroneously matched input surface regions (e.g. because their signatures happen to match even though their content actually varies) causing an output surface region to not be regenerated for more than a given, e.g. desired or selected, period of time.

A saturating counter, for example, may be provided to count the number of frames that the region was unchanged for, and if this number exceeds a certain, in an embodiment selected, in an embodiment predefined value, such as 60 (e.g. with a 60 Hz output display rate), then the region of the output frame may be regenerated. In an embodiment, each output surface region is regenerated at least once per second.

In this case, the output surface region(s) may be regenerated, e.g., by simply writing out an entire new output surface periodically (e.g. once a second). However, in some embodiments, new versions of output surface regions are written out to the output surface individually on a rolling basis, so that rather than writing out a complete new version of an output surface in one go, a selected portion of the output surface is written out anew each time a new version of the output surface is generated, in a cyclic pattern so that over time all of the output surface is eventually written out as new.

This operation is, in some embodiments, achieved by disabling the input surface region checking process for the relevant output surface regions (i.e. for those regions that are to be written to the output surface in full). (Content signatures are in some embodiments still generated for the regions that are written to the output surface in full, as that will then allow those regions to be compared with future input surface regions.)

If the output surface region is to be regenerated then it should be re-generated (i.e. generated afresh) using the input surface regions in the appropriate manner for the output surface generation process that is being performed. Thus, this could comprise, for example, re-compositing and/or re-writing the data for displaying the region of the output surface to the output, e.g. frame, buffer that is storing the output surface.

On the other hand, if it is determined that there has not been a change in the contributing input surface region or regions since the previous version of the output surface region was generated, then the region of the output surface (to which the region or regions of the input surface(s) contribute) should not be, and, in an embodiment, is not, regenerated (i.e. the existing version of the output surface region (of the data for the region of the output surface) is retained in the, e.g., buffer that is storing the output surface (and reused). In this way, memory bandwidth and power is not spent on processing output surface regions that should not have changed.

Although the technology described herein has been described above with particular reference to the processing of a single region of the output surface, as will be appreciated by those skilled in the art, where the output surface is made up of plural regions, the technique of the technology described herein can be, and is, in an embodiment, used for plural, and, in an embodiment, for each, respective region of the output surface. Thus, in an embodiment, plural regions of, and, in an embodiment, each region of, the output surface are processed in the manner of the technology described herein. In this way, the whole output surface will be generated by the process of the technology described herein.

The output surface region regeneration can be triggered and performed as desired, e.g. by whichever component controls the generation of the output surface from the input surfaces. Thus, in one embodiment, the system includes a window compositor or composition engine that will generate and regenerate the output surface from the one or more input surfaces in the appropriate manner. In other arrangements, an application may control and be responsible for the regeneration of the output surfaces from the input surfaces.

The input surface(s) and the output surface can be stored in any suitable and desired manner in memory. They are, in an embodiment, stored in appropriate buffers. For example, the output surface is, in an embodiment, stored in an output frame buffer.

The output surface buffer may be an on-chip buffer or it may be an external buffer (and, indeed, may be more likely to be an external buffer (memory), as will be discussed below). Similarly, the output surface buffer may be dedicated memory for this purpose or it may be part of a memory that is used for other data as well. In some embodiments, the output surface buffer is a frame buffer for the graphics processing system that is generating the surfaces and/or for the display that the surfaces are to be displayed on.

Similarly, the buffers that the input surfaces are first written to when they are generated (rendered) may comprise any suitable such buffers and may be configured in any suitable and desired manner in memory. For example, they may be an on-chip buffer or buffers or may be an external buffer or buffers. Similarly, they may be dedicated memory for this purpose or may be part of a memory that is used for other data as well. The input surface buffers can be, e.g., in any format that an application requires, and may, e.g., be stored in system memory (e.g. in a unified memory architecture), or in graphics memory (e.g. in a non-unified memory architecture).

In an embodiment, each new version of an input surface is written into a different buffer to the previous version of the input surface. For example, new input surfaces may be written to different buffers alternately or in sequence.

Once a given region or regions of an input surface have been used to generate the corresponding region(s) in the output surface, then it would be possible to retain that version of the input surface in a buffer, for example for comparison with the next version of the input surface that is generated. However, where, as discussed above, information, such as signatures, representative of the content of the input surface(s) are used for the change checking process, it is only necessary to retain the "signature" information for the input surface that was used to generate the current version of the output surface, and not the actual content of that input surface in a buffer (since the input surface buffers content has already been used to generate the current version of the output surface).

Thus, in some embodiments, once the output surface has been generated using a new version of an input surface, that input surface is allowed to be overwritten in the buffer where it is stored. In these cases, however, a set of input surface region "signatures" (or other information indicative of the content of the input surface) for the version of the input surface that was used to generate the current version of the output surface, is maintained. Thus, in some embodiments, two sets of "content" signatures (or other information indicative of the content of a surface) are maintained for each input surface, one set for the input surface that was used to generate the current version of the output surface, and another set for the next, new version of the input surface. These two sets of signatures (or other information) are then compared, as discussed above, to determine those regions of the input surface that have changed.

Furthermore, as the output surface is regenerated with a new version of the input surface, the set of signatures or other content-indicating information for the input surface that was used to generate the current version of the output surface (e.g. that was used to generate the output surface as it exists in the output buffer) is in some embodiments correspondingly updated with the new signatures (or other content indicating information) for the regions of the new version of the input surface that was used to generate the current version of the output surface. This could either be done, for example, by updating the signature (or other content indicating information) in the set of that information for the input surface that was used to generate the current version of the output surface for those regions of the input surface that have changed only, or, for example, the complete set of signatures (or other content-indicating information) for the new version of the input surface could simply be retained as, or copied to, the set of signatures, etc., for the version of the input surface that was used to generate the current version of the output surface.

The input surfaces from which an output surface is formed may be updated at different rates or times. Thus, the method may include checking whether an input surface has been updated since the output surface was last regenerated and, only performing steps (i)-(iii) for that input surface (or signature checks for that input surface) if the input surface had been updated since the output surface was last regenerated. Similarly, if an input surface has changed multiple times since the output surface was last generated, the appropriate earlier version of the input surface should be compared with the current version of the input surface.

Two or three (or more) versions of the output surface may be stored in buffers (i.e. the output surface might be double (or triple) buffered). In such cases, it must be ensured that the appropriate earlier version of the input surface region signature should be compared with the current input region signature. In other words, instead of comparing the current input region signature with the previous output surface's region input signature, the current region input signature is compared with the region input surface signature from the appropriate number of frames ago. Thus, in cases where the output surface is double, triple or more buffered, (i.e. more than one version of the output surface is stored in a buffer at a particular time), corresponding additional signatures should also be stored.

In some embodiments, the technology described herein is used in conjunction with another frame (or other output) buffer power and bandwidth reduction scheme or schemes, such as, and in some embodiments, output (e.g. frame) buffer compression (which may be lossy or loss-less, as desired).

In some embodiments, the apparatus comprises, and/or is in communication with, one or more buffers and/or memory devices that store the data described herein, and/or store software for performing the processes described herein. The apparatus may also be in communication with a host microprocessor, and/or with a display for displaying images based on the data generated by the data processing system.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner. Similarly, the display that the windows are to be displayed on can be any suitable such display, such as a display screen of an electronic device, a monitor for a computer, etc.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics processor and renderer, such as processors having a "pipelined" rendering arrangement (in which case the renderer will be in the form of a rendering pipeline). It is particularly applicable to tile-based graphics processors, graphics processing systems, composition engines and compositing display controllers.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on one or more data processors, a computer program element comprising computer software code portions for performing the methods herein described when the program element is run on one or more data processors, and a computer program comprising software code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising one or more data processors causes in conjunction with said one or more data processors said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

FIG. 1 shows schematically the use of two input surfaces 1a, 1b (which may, for example, be application windows generated for display in a compositing window system) being used to generate an output surface 2 (which may, e.g., be an output window (frame) for display to a user).

As shown in FIG. 1, the respective input and output surfaces are each divided into a plurality of respective regions 11. In the present embodiments these regions 11 correspond to respective rendering tiles that a graphics processor that is rendering the respective surfaces generates. However, other arrangements and configurations of regions could be used if desired.

The hatched regions in the input surfaces 1a and 1b indicate the regions which contribute to a particular region of the output surface 2 (also hatched). The dotted lines show how those regions of the input surfaces 1a and 1b map onto the corresponding region of the output surface 2. As can be seen from FIG. 1, in this case there is 1:1 mapping between the regions of the input surfaces 1a and 1b and the corresponding region of the output surface 2 where those regions are to be displayed.

Figure 2:
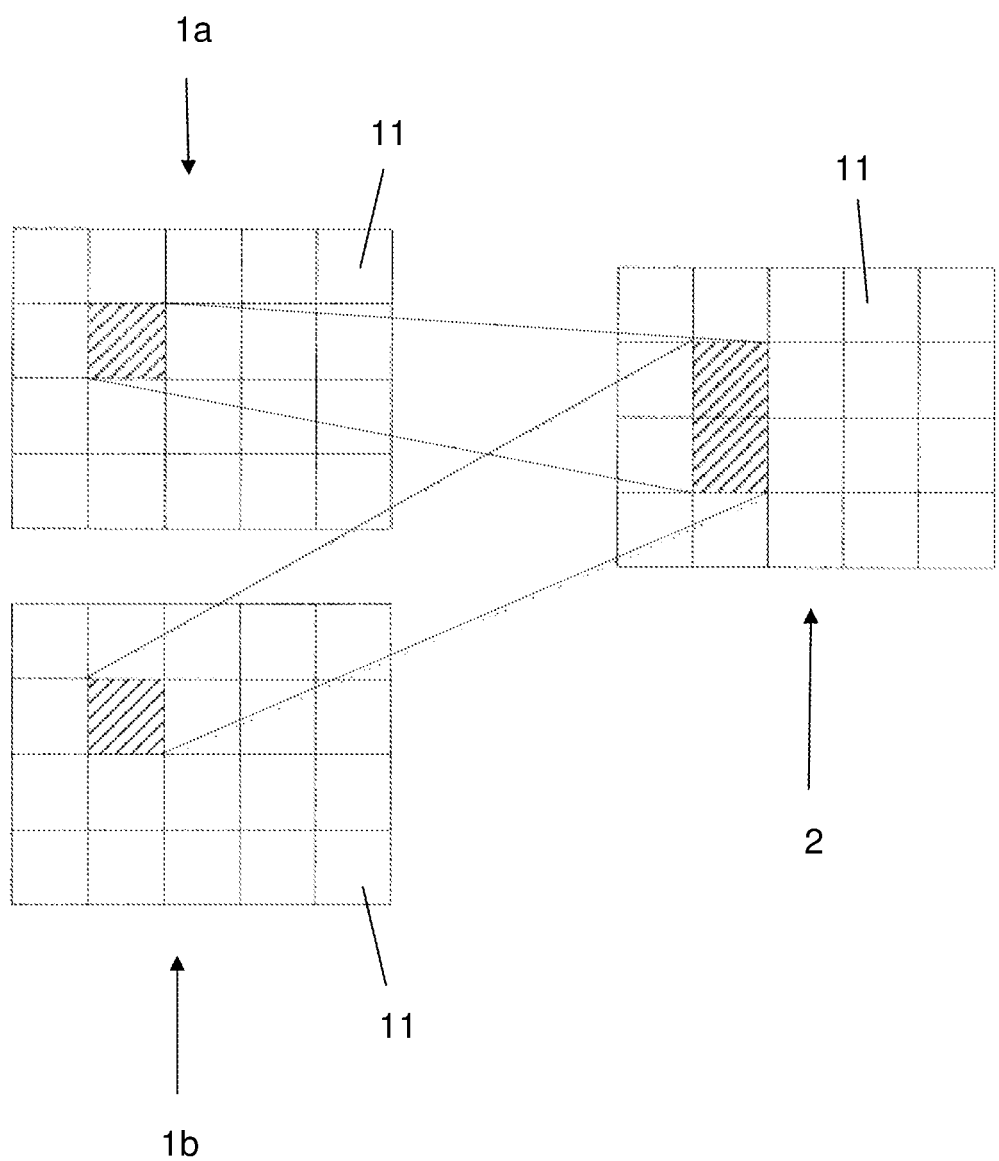
FIG. 2 is a schematic diagram illustrating the mapping of two input surfaces onto a single output surface where a tile in an input surface maps onto multiple output tiles.

FIG. 2 is similar to FIG. 1 except that there is not 1:1 mapping between the regions in the input surfaces 1a, 1b and the region of the output surface 2. In this case, a single region in each of the input surfaces 1a and 1b maps onto two regions of the output surface 2, i.e. there is 1:n mapping, where n>1. Although the output surface is still processed a region at a time, a single region in an input surface may map onto multiple output regions.

Figure 3:
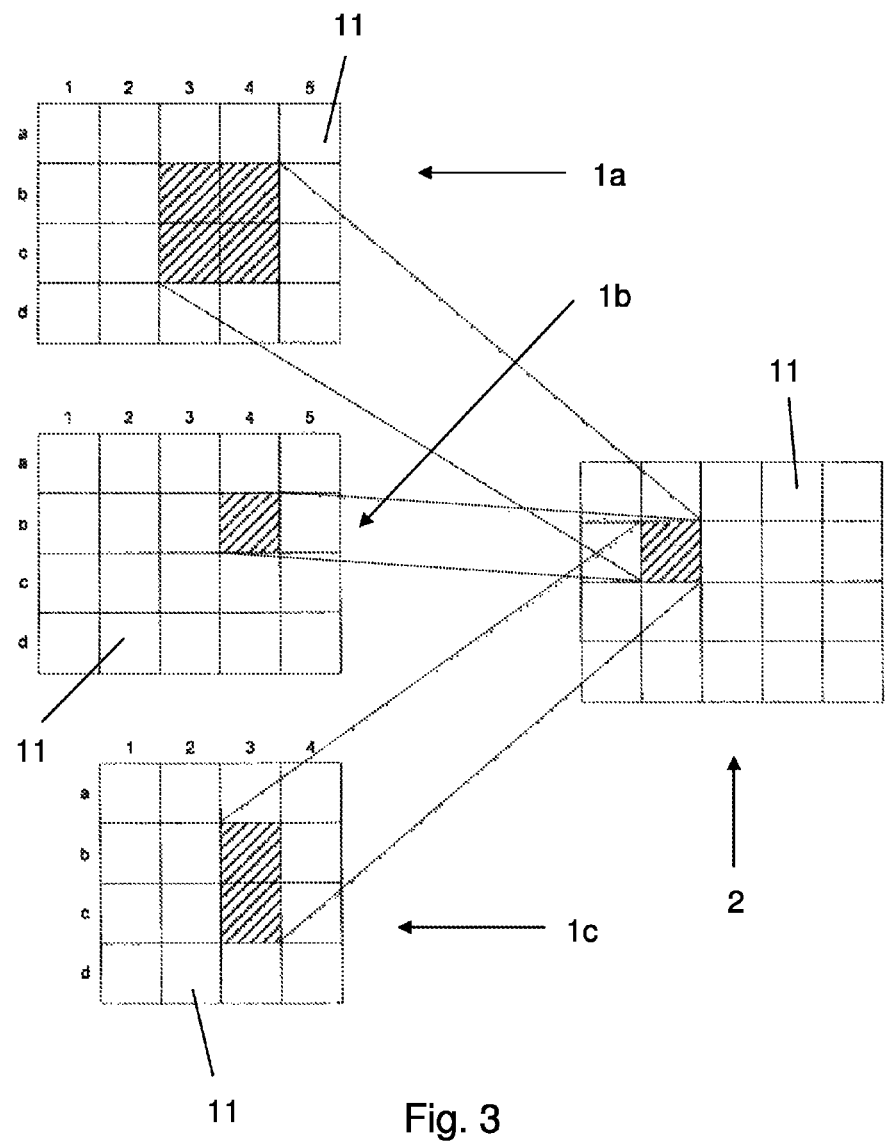
FIG. 3 is a schematic diagram illustrating the mapping of three input surfaces onto a single output surface with varying scaling applied to the different input surfaces.

FIG. 3 illustrates a case where there are three input surfaces 1a, 1b and 1c. Here, from input surfaces 1a and 1c, multiple input surface regions (four and two, respectively) map onto a single output surface region, i.e. there is n:1 mapping, where n>1. From input surface 1b, a single input surface region maps onto a single output surface region, i.e. there is 1:1 mapping. Thus, there may be different mappings to the output surface from different input surfaces.

In the present embodiment, in order to generate the output surface 2 from the input surfaces 1a, 1b (and 1c) the output surface 2 is generated one region 11 at a time, with each output surface region 11 being generated from the respective input surface regions that contribute to that output surface region.

Furthermore, in accordance with the technology described herein, as part of this process it is determined whether any of the contributing input surface regions have changed since the output surface region in question was last generated, and if any of the contributing input surface regions have changed, then the output surface region is regenerated, but if it is determined that none of the contributing input surfaces has changed since the output surface region was last generated, the output surface region is not regenerated, but rather the existing version of the output surface region is retained.

To do this, when a new version of the output surface 2 is to be generated from the input surfaces 1a, 1b (and 1c), it is first determined if any of the input surfaces have been transformed. If any of the input surfaces are transformed (e.g. resized, moved, rotated, moved forwards or backwards, etc.) between versions of the output surface (e.g. between output frames), then the output surface is simply regenerated from the input surfaces as a whole (i.e. all of the regions of the output surface are re-generated).

Otherwise, for each output surface region in turn, it is determined if the input surface regions to be used to generate the output surface region have changed since the output surface region was last generated.

To do this, when each output surface region is to be generated, it is first determined which input surface regions contribute to that output surface region.

The determination of which input surface regions contribute to a given output surface region is based, e.g., on the process (e.g. algorithm) that is being used to generate the output surface region from the input surfaces (as the, e.g., window compositing process will typically specify which input surface regions should be used to generate a given output surface region (and how)).

Alternatively, a record could be maintained of the input surface regions that contributed to each respective output surface region. FIG. 3 illustrates such an arrangement and shows a possible labelling scheme for the regions of the input surfaces 1a, 1b, 1c using alpha-numeric coordinates (in this case x-coordinates 1-5, and y-coordinates a-d).

In this case, when it is determined which regions of the input surfaces 1a, 1b, 1c map onto a particular region of the output surface 2, meta data is stored for that region of the output surface 2 recording this.

For example, in the case of FIG. 3, the meta data stored for the hatched region of the output surface 2 could be:

Surface 1a: (3b, 4b, 3c, 4c)
Surface 1b: (4b)
Surface 1c: (3b, 3c)

Thus, for each input surface 1a, 1b, 1c, the regions which map onto a given region of the output surface 2 are recorded with alpha-numeric coordinates. Of course, other coordinate or region-labelling schemes could also be used to indentify the regions of the input surfaces, such as simply numbering the regions in a given order.

In the present embodiment, only visible input surface regions (for an output surface region) are considered as contributing to an output surface region and compared (as some input surfaces may be "displayed" behind other input surfaces which are opaque).

Figure 4:
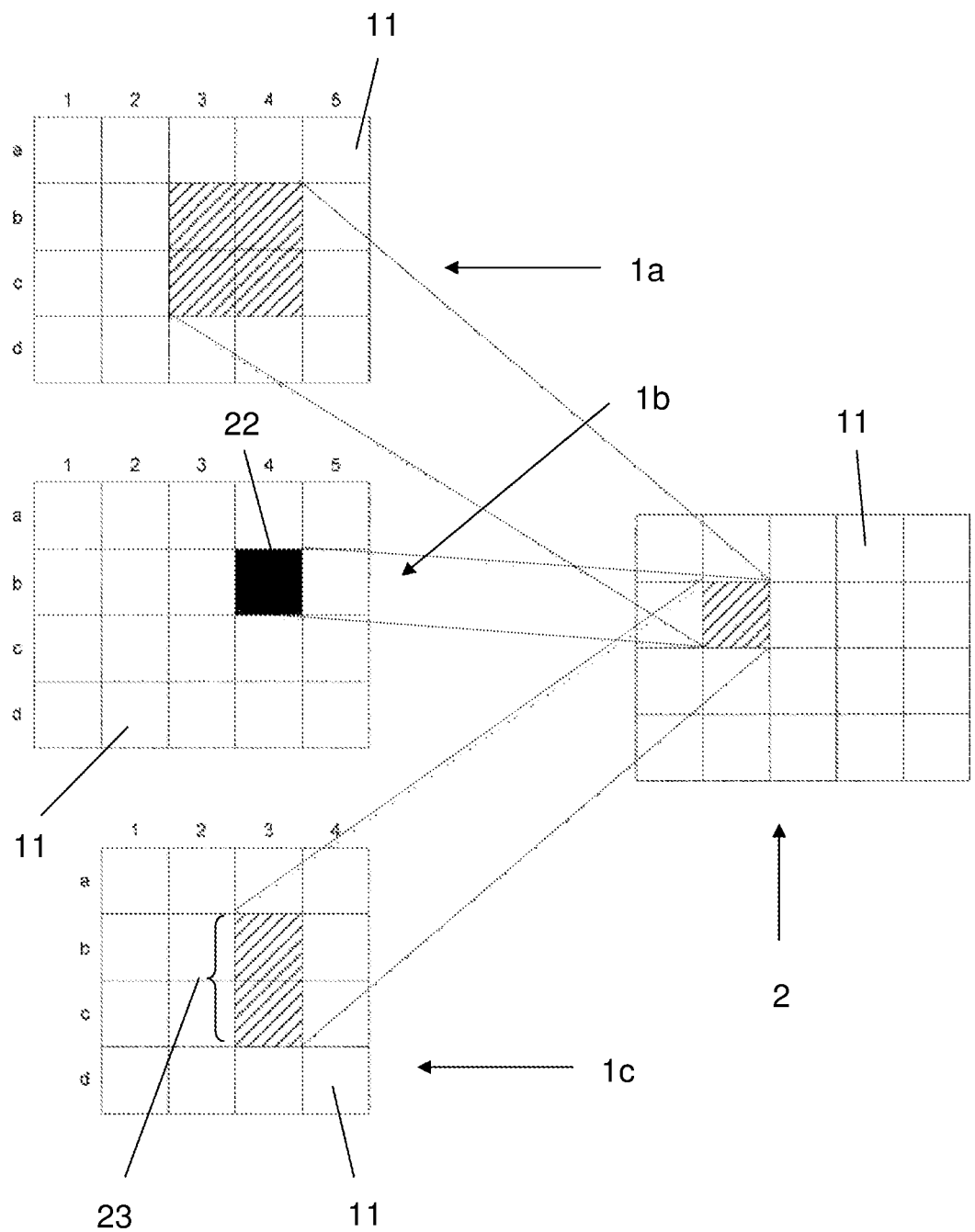
FIG. 4 is a schematic diagram illustrating the mapping of three input surfaces onto a single output surface with scaling and an opaque input surface.

FIG. 4, which is similar to FIG. 3, illustrates this and shows that the mapped region 22 of input surface 1b is opaque. This is indicated by solid shading. The order in which the input surfaces 1a, 1b, 1c are to be displayed on the output surface 2 is, in this case, from bottom to top, 1c, 1b, 1a. Thus, since the mapped region 22 of surface 1b is opaque, the mapped region 23 of surface 1c is not visible in the output surface 2, i.e. it is masked by the opaque region 22 of surface 1b. This means that there is no need for any data relating to the mapped region 23 of surface 1c to be stored and/or checked. In this case the meta data regarding the output surface contribution for the region, if used, may simply consist of:

Surface 1: (3b, 4b, 3c, 4c)
Surface 2: (4b)

Once the input surface regions that will contribute to a given output surface region have been determined, it is then determined whether any of those input surface regions have changed since the output surface region was last generated.

In the present embodiment, this is done by comparing signatures representative of the content of the versions of the input surface regions that were used to generate the version of the output surface region that is currently stored for the output surface, with signatures representative of the content of the versions of the input surface regions that are to be used to generate the new version of the output surface region.

To do this, for each input surface region, a corresponding signature representative of its content is generated and stored (the signature generation process will be described in more detail below). Two sets of input surface region content-representing signatures are maintained, one set for the versions of the input surface regions that we used to generate the version of the output surface region that is currently stored for the output surface, and one set representative of the content of the versions of the input surface regions as they currently stand (i.e. that would be used to generate a new version of the output surface region at the time in question).

Then, in order to determine whether any of the input surface regions that will contribute to a given output surface region have changed since the output surface region was last generated, for each respective pair of versions of each contributing input surface region (i.e. the version of the input surface region that was used to generate the version of the output surface region that is currently stored for the output surface and the version of the input surface region that is to be used to generate the new version of the output surface region), the content-representing signatures are compared, and if the signatures are the same, the input surface region is considered not to have changed, but if the signatures differ, the input surface region is considered to have changed.

If it is determined that all the input surface regions that contribute to (that will be used to generate) the output surface region have not changed since the output surface region was last generated, then the output surface region is not regenerated, but rather the currently stored version of the output surface region is reused. Otherwise, the output surface region is regenerated using the appropriate input surface regions. This process is repeated for each output surface region.

Figure 5:
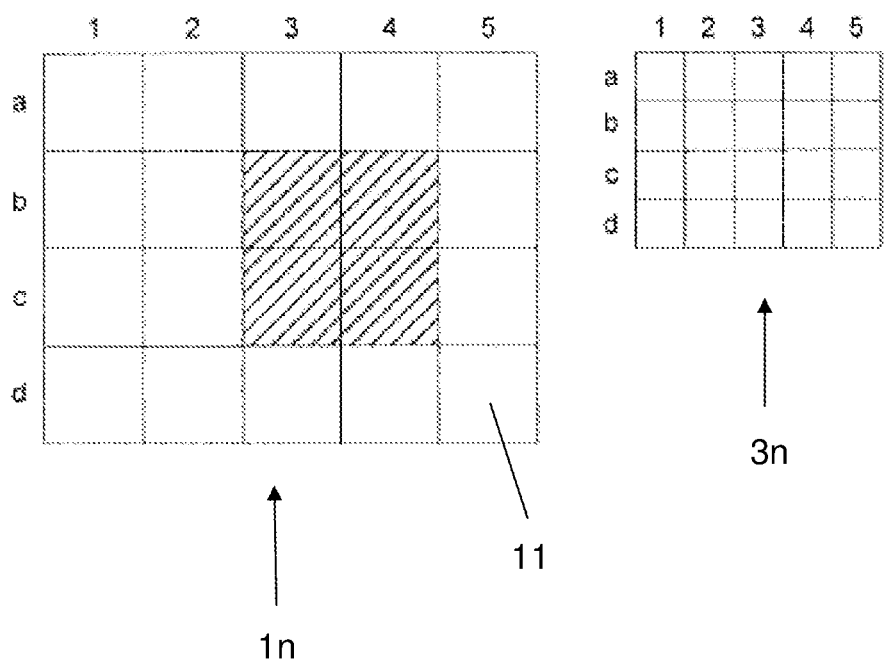
FIG. 5 is a schematic diagram illustrating an input surface and its corresponding signatures.

FIG. 5 shows an example of an input surface 1n (with a mapped area consisting of regions 3b, 4b, 3c and 4c), with a corresponding set of signatures 3n.

Figure 6:
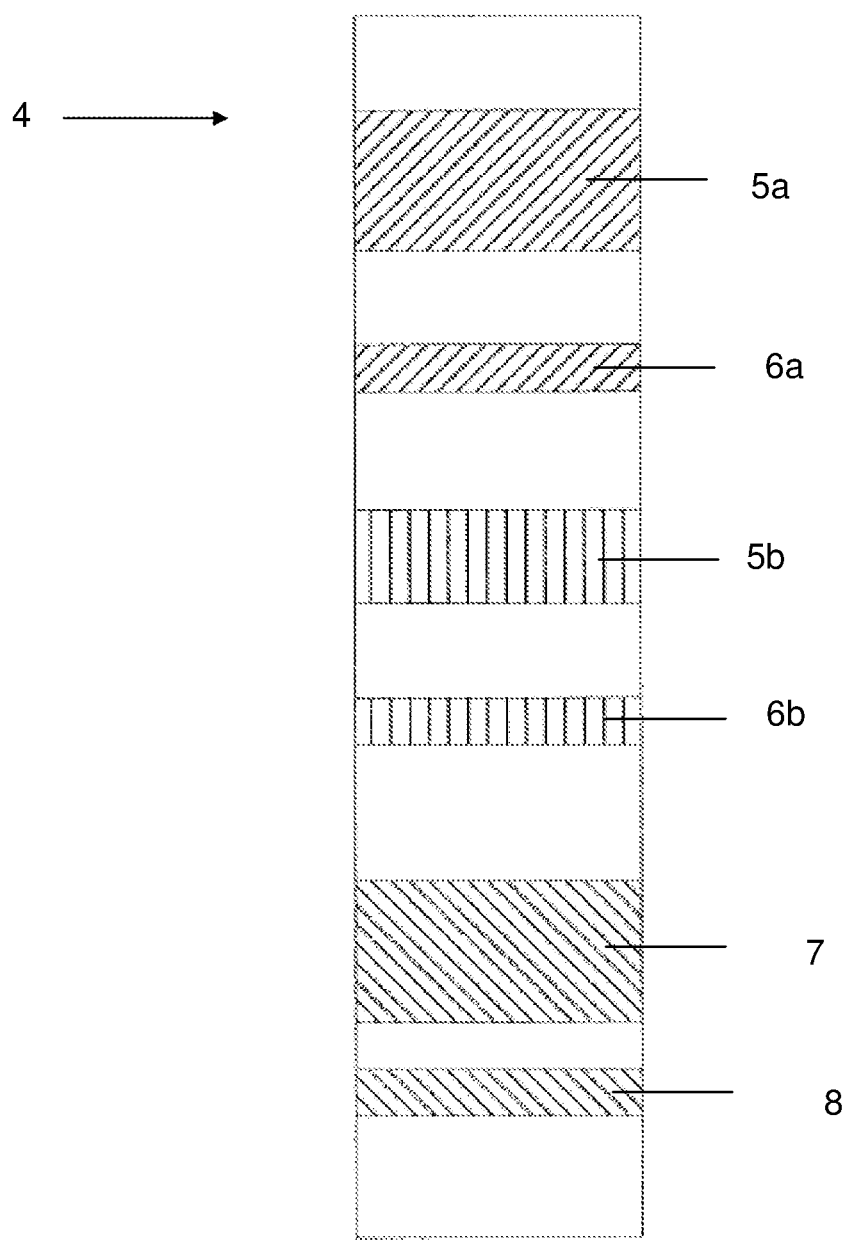
FIG. 6 is a schematic diagram illustrating a memory map for two input surfaces and their corresponding output surface.

FIG. 6 shows how the surface and signature data may be stored in memory 4. For each input surface (in this example there are two), the data from which the surfaces are formed is stored in parts of memory 5a and 5b, and corresponding content-indicating signatures are stored in parts of memory 6a and 6b. As discussed above, two sets of corresponding content-indicating signatures are stored in the parts memory 6a and 6b, one set representative of the content of the versions of the input surface regions that we used to generate the currently stored output surface, and the second set of signatures representative of the content of the versions of the input surface regions as they currently stand (i.e. that will be used to generate any new version of the output surface).

For the output surface, the data from which the surface is formed is stored in part of memory 7 (and, if required, meta data indicating which regions of which input surfaces were used to generate the output surface regions is stored in part of memory 8).

Figure 7:
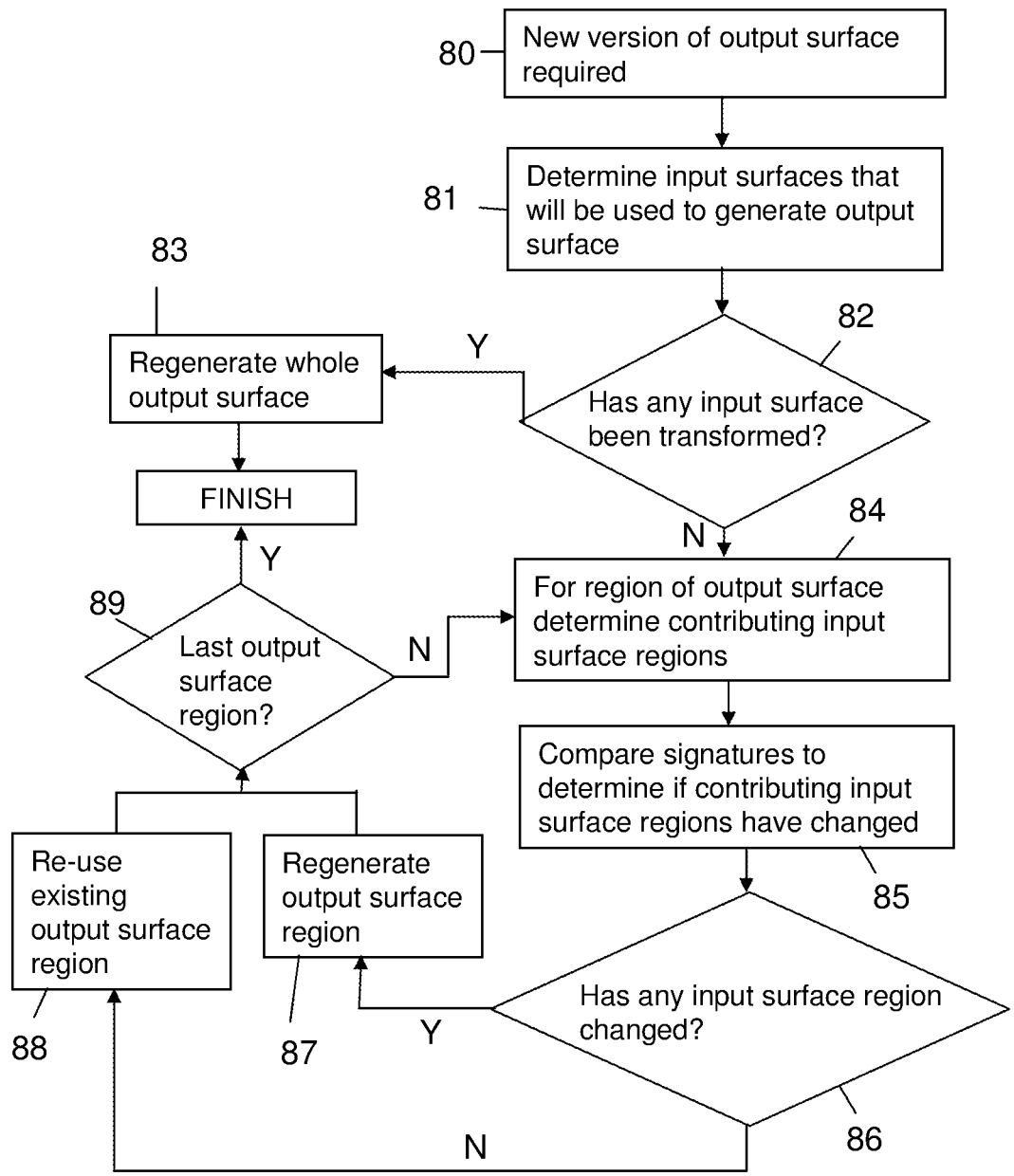
FIG. 7 is a flow diagram illustrating the process for generating a region in an output surface.

FIG. 7 illustrates this operation. As shown in FIG. 7, the process starts when a new version of the output surface is required (step 80). This may be because, for example, a display needs to be refreshed.

The input surfaces that are to be used to generate the output surface are determined (step 81), and it is then checked whether any of those input surfaces has been transformed since the previous version of the output surface was generated (step 82).

If any one (or more) of the input surfaces has been transformed, then the output surface as a whole is regenerated (step 83).

On the other hand, if none of the input surfaces has been transformed, then for each region of the output surface in turn, it is first determined which input surface regions will contribute to that output surface region (step 84). Then the stored signatures for the respective versions of the determined input surface regions are compared to determine if the contributing input surface regions for the output surface region in question have changed (step 85).

If it is determined that any one or more of the contributing input surface regions for an output surface region has changed (step 86), then the output surface region is regenerated (step 87) using the appropriate contributing input surface regions. Otherwise, the existing output surface region is reused without regenerating the output surface region (step 88). This is repeated for each output surface region (step 89) until the whole output surface has been regenerated (if required).

The regenerated output surface may later be used as an input surface. Thus, as an output surface region is being regenerated (step 87), in some embodiments this step includes generating and storing a signature for the output surface region.

There may usually only be a few input surfaces when generating an output surface. However, in order to reduce the amount of data written (and resources required to check if the input surface regions have changed), in the present embodiment only a limited number of surfaces and regions are considered and logged. If a large number of input surface regions are used to build the output surface region, a content-indicating signature for the entire input surface is used instead for the comparison. If a large number of input surfaces are used, the output surface region is simply be marked not to be compared—and must be regenerated in the next version of the output surface.

Also, in the present embodiment, an output surface region is regenerated irrespective of whether its contributing input surface regions have changed or not, if the output surface region has been unchanged for a selected, threshold number of versions of the output surface (e.g. output frames). To facilitate this, saturating counters that count the number of versions of the output surface (e.g. new frames) that an output surface region has been unchanged for could be stored, if desired. This can help to ensure that erroneous signature matches do not cause erroneous output for an extended period of time.

As discussed above, it is believed that the technology described herein will have particular application to compositing window systems, i.e. in which the contents of windows to be displayed on a display, e.g., for a graphical user interface, are first drawn into "off-screen" memory buffers (window buffers), and then combined (composited) and the result written to the frame buffer for the display to be displayed.

In this case, the input surfaces discussed above will be the input windows to be displayed, and the output surface will be the final, output, composited output window (frame).

FIGS. 8 to 11 show schematically such a compositing window system to which the technology described herein can be applied.

Figure 8:
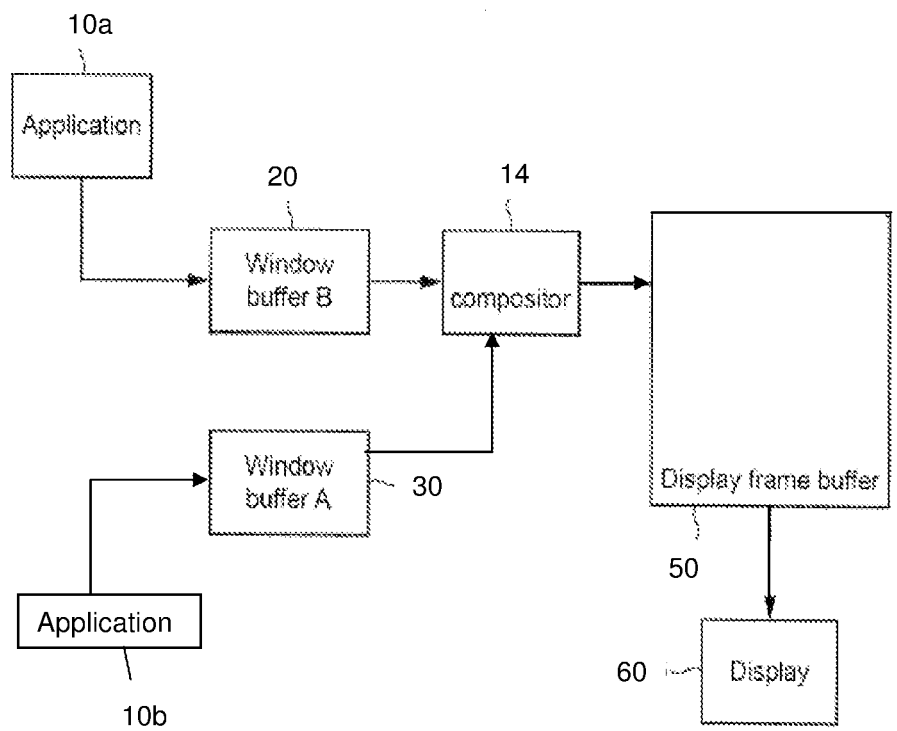
FIG. 8 shows schematically the operation of a compositing window system for displaying windows on a display.

FIG. 8 illustrates the window compositing process and shows schematically the generation of windows for two applications 10a, 10b such as games, productivity applications (e.g. word-processor, spreadsheet), etc., to be displayed on a display 60. The display 60 may be any suitable form of electronic display, such as a screen of a monitor for a personal computer, a screen of a device such as a phone, tablet, PDA, etc.

As shown in FIG. 8, as successive versions of the windows to be displayed are generated, they are written into respective window buffers 20, 30. The window buffers 20, 30 are read by a compositor 14 and written to the frame buffer 50 for the display for display. This writing can, as is known in the art, involve, for example, blending the windows, applying some form of geometric transformation to the windows as they are written from the window buffer to the frame buffer, etc., and/or just be an opaque copy. When an input window needs to be updated (for example due to user interaction), the window is redrawn into a new window buffer, from which the compositor 14 then writes the new version of the window to the display's frame buffer 50.

The display frame buffer 50 is then read to display the frame on the display 60.

Figure 9:
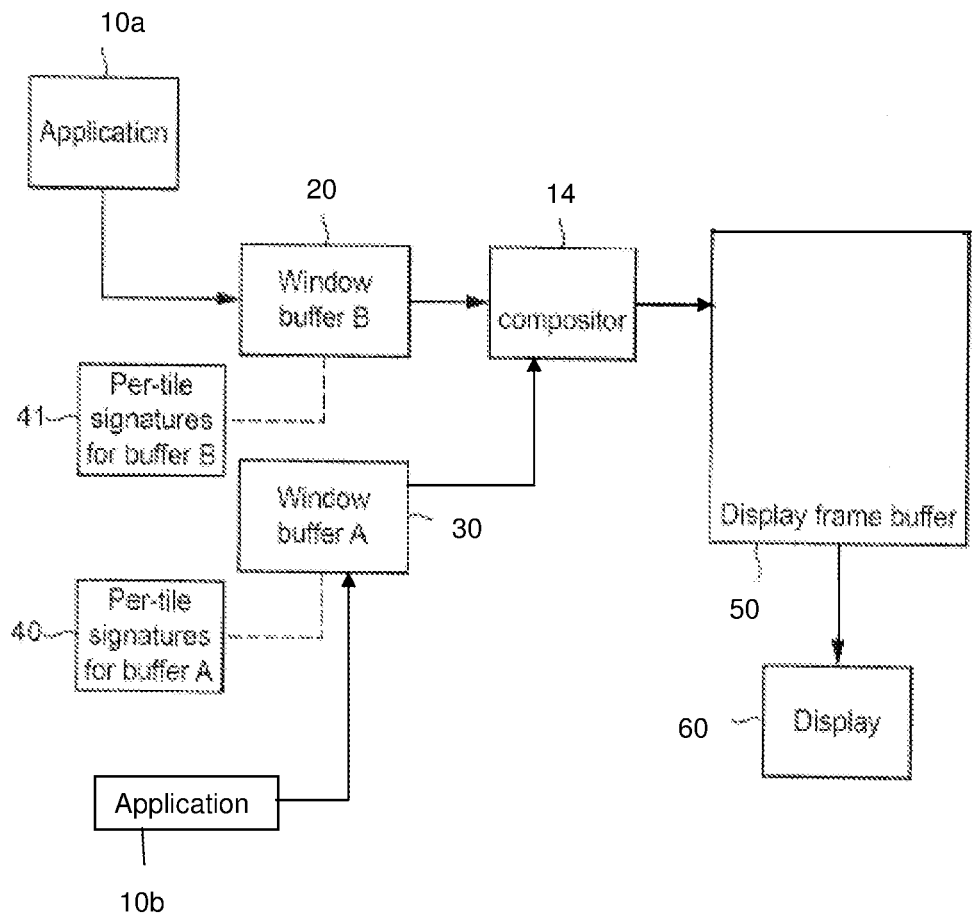
FIG. 9 shows schematically an embodiment of the technology described herein.

FIG. 9 shows schematically this operation in a system that operates in the manner of the embodiment of the technology described herein.

As shown in FIG. 9, as respective versions of the windows for the applications 10a, 10b are written into the window buffers 20, 30, corresponding sets of per tile signatures indicative of the content of each respective tile in the window buffers are stored in association with the corresponding window buffer. This is done each time a new version of an application window is generated and written to a window buffer.

Then, when an updated version of the output frame (window) is required (e.g. due to a display refresh) the above process of the embodiment of the technology described herein is used when generating the new version of the output frame.

Thus, as discussed above, it will first be determined if any of the input windows have been transformed since the output frame was last generated, and if so, the output frame (i.e. the output frame tiles) will simply be regenerated.

Otherwise, for each output frame buffer tile, it will be determined which input window tiles contribute to that output frame buffer tile, and then corresponding content-indicating signatures for the respective input window tiles will be compared to determine whether the input window tiles have changed. If the input window tiles have not changed, then the previous output frame buffer tile will be reused and the output frame buffer tile regeneration will be skipped. Otherwise, the output frame buffer tile will be regenerated. This is repeated for each respective output frame buffer tile in turn (or in parallel), regenerating any output frame buffer tiles as required.

This process may be done, for example, by the application itself, by the compositor 14, or by any other suitable element or component of the system.

In this embodiment, it is assumed that the compositor 14 is, as is known in the art, a separate process running in the system which copies window buffers from several applications in the system. The compositor 14 may use alpha-blending, transformations or other techniques rather than straight copies when writing a window to a display frame buffer 50, if desired. The technology described herein can also be used when an application is responsible for writing its own window buffers to the display frame buffer 50.

This process is repeated whenever a new version of the output frame is to be generated, as new versions of the output frame are generated.

Although in the above embodiments, the output surface is written to a frame buffer for display on a display, other arrangements would be possible. For example, in some embodiments, the output surface may also or instead later be used as an input surface. Similarly, the output surface might not be sent to the display but might be sent across a network, e.g. to a remote display. In some embodiments, once an output surface region has been generated, it may be sent directly to a display without writing it to memory.

The generation of the per-tile signatures for the input windows in the present embodiments will now be described in more detail.

Figure 10:
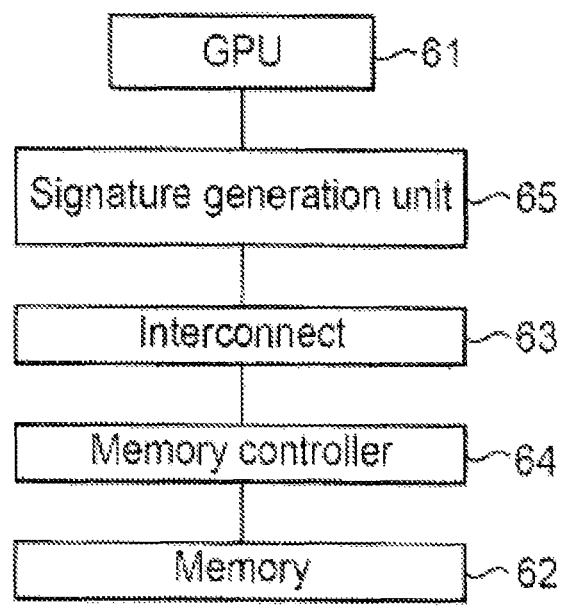
FIG. 10 shows schematically an embodiment in which the technology described herein is used in conjunction with a tile-based graphics processor.

In the present embodiments, the input windows to be displayed (the input surfaces) are generated by a graphics processing system. FIG. 10 shows schematically an arrangement of a graphics processing system that can be used in embodiments of the technology described herein.

The graphics processing system includes, as shown in FIG. 10, a tile-based graphics processor or graphics processing unit (GPU) 61, which, as is known in the art, produces tiles of a surface to be generated by the GPU 61.

As is known in the art, in such an arrangement, once a tile has been generated by the graphics processor 61, it would then normally be written to a buffer in memory 62, e.g., via an interconnect 63 which is connected to a memory controller 64. Sometime later the buffer will, e.g., be written, as discussed above, to a frame buffer for display on a display.

In the present embodiment, this process is modified by the use of a signature generation hardware unit 65. In essence, and as will be discussed in more detail below, the signature generation unit 65 operates to generate for each tile a signature representative of the content of the tile.

Figure 11:
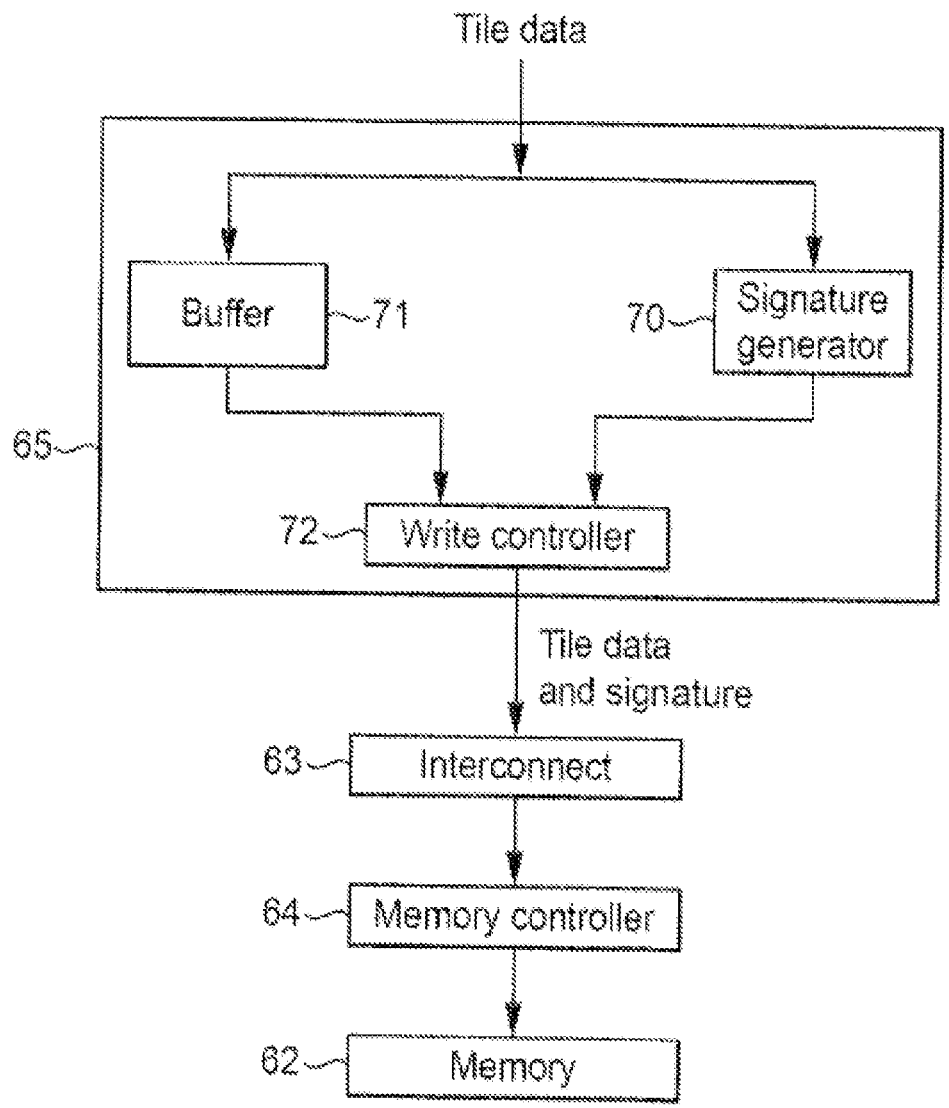
FIG. 11 shows schematically and in more detail the signature generation unit of the embodiment shown in FIG. 10.

FIG. 11 shows the signature generation unit 65 in more detail.

As shown in FIG. 11, tile data is received by the signature generation unit 65 from the graphics processor 61 and is passed both to a buffer 71 which temporarily stores the tile data while the signature generation process takes place, and a signature generator 70.

The signature generator 70 operates to generate the necessary signature for the tile. In the present embodiment the signature is in the form of a 32-bit CRC for the tile.

Other signature generation functions and other forms of signature such as hash functions, etc., could also or instead be used, if desired. It would also, for example, be possible to generate a single signature for an RGBA tile, or a separate signature for each colour plane. Similarly, colour conversion could be performed and a separate signature generated for each of Y, U and V. In order to reduce power consumption, the tile data processed by the signature generator 70 could be reordered (e.g. using the Hilbert curve), if desired.

Once the signature for the new tile has been generated, it is stored, as discussed above, in a per-tile signature buffer that is associated with the version of the surface in question in the memory 62, under the control of a write controller 72. The corresponding tile data is also stored in the appropriate buffer in the memory 62.

As will be appreciated from the above, the technology described herein, in some embodiments at least, can be used to avoid write traffic and processing for sections of an output surface that don't actually change from one version of the output surface to the next (e.g. in the case of a user interface). This can save a significant amount of bandwidth and power consumption in relation to the output surface generation operation.

This is achieved, in some embodiments of the technology described herein at least, by determining whether the input surface regions that contribute to an output surface region have changed or not, and regenerating the output surface region if it is determined that the input surface regions that contribute to the output surface region have changed, but if the contributing input surface regions have not changed, then not regenerating the output surface region.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of generating an output surface from one or more input surfaces in a data processing system, the method comprising:
   generating the output surface as a plurality of respective regions that together form the output surface, each respective region of the output surface being generated from a respective region or regions of one or more input surfaces; and
   when a new version of the output surface is to be generated, for at least one region of the output surface:
   (i) determining which region or regions of the input surface or surfaces contribute to the region of the output surface;
   (ii) checking whether the contributing region or regions of the input surface or surfaces have changed since the previous version of the output surface region was generated; and
   (iii) if there has been a change in the contributing region or regions of the input surface or surfaces since the previous version of the region in the output surface was generated, regenerating the region of the output surface,
   wherein there are two or more input surfaces and the method comprises performing steps (i) and (ii) for each input surface, and if there has been a change in the contributing region or regions of any of the input surfaces since the previous version of the output surface region was generated, regenerating the region of the output surface, and
   wherein the data processing system is a compositing window system, and the input surfaces each comprise respective input windows that are to be composited into an output window.

2. A method as claimed in claim 1, comprising performing steps (i) to (iii) for each region of the output surface.

3. A method as claimed in claim 1, wherein step (i) includes:
  determining which region or regions of an input surface will be visible in the output surface region.

4. A method as claimed in claim 1, comprising determining which region or regions of the input surface or surfaces contribute to a region of the output surface based on the process that is to be used to generate the output surface from the input surface or surfaces.

5. A method as claimed in claim 1, comprising determining which region or regions of the input surface or surfaces contribute to a region of the output surface based on a stored record indicating which region or regions of the input surface or surfaces contribute to the region of the output surface.

6. A method as claimed in claim 1, wherein step (ii) comprises checking whether a signature or signatures representing the content of the contributing input surface region or regions have changed since the previous version of the output surface region was generated.

7. A method as claimed in claim 1, wherein step (iii) comprises generating and storing a signature or signatures representing the content of the output surface region that has been regenerated.

8. A method as claimed in claim 1, wherein if the number of input surface regions that contribute to the output surface region exceeds a threshold number, step (ii) comprises checking whether a signature or signatures representing the content of the contributing input surface or surfaces have changed since the previous version of the output surface region was generated.

9. A method as claimed in claim 1, comprising if the number of input surface regions that contribute to the output surface region exceeds a threshold number, regenerating the region of the output surface without performing steps (ii) and (iii) for the output surface region.

10. A method as claimed in claim 1, comprising, when a new version of the output surface is to be generated:
  first determining if any of the input surfaces that are to be used to generate the output surface have been transformed since the previous version of the output surface was generated; and
  if any of the input surfaces that will be used to generate the output surface has been transformed since the previous version of the output surface was generated, regenerating all of the regions of the output surface; or
  if none of the input surfaces that will be used to generate the output surface has been transformed since the previous version of the output surface was generated, performing steps (i), (ii) and (iii) for at least one region of the output surface.

11. A method as claimed in claim 1, comprising, when a new version of the output surface is to be generated:
  first determining if any of the input surfaces that are to be used to generate the output surface have been transformed since the previous version of the output surface was generated; and
  if any of the input surfaces that will be used to generate the output surface has been transformed since the previous version of the output surface was generated, determining which region or regions or the output surface will be altered as a consequence of the transformed input surface or surfaces, and regenerating that region or those regions of the output surface; or
  if none of the input surfaces that will be used to generate the output surface has been transformed since the previous version of the output surface was generated, performing steps (i), (ii) and (iii) for at least one region of the output surface.

12. A method as claimed in claim 1, further comprising checking whether an input surface has been updated since the output surface was last regenerated and, only performing steps (i)-(iii) for that input surface if the input surface had been updated since the output surface was last regenerated.

13. An apparatus for generating an output surface from one or more input surfaces in a data processing system, the apparatus comprising:
  memory that stores one or more input surfaces to be used to generate an output surface; and
  processing circuitry configured to generate an output surface as a plurality of respective regions that together form the output surface, each respective region of the output surface being generated from a respective region or regions of one or more of the input surfaces; wherein:
  the processing circuitry is further configured to, when a new version of the output surface is to be generated:
  for at least one region of the output surface, determine which region or regions of the input surface or surfaces contribute to the region of the output surface;
  check whether the contributing region or regions of the input surface or surfaces have changed since the previous version of the output surface region was generated; and
  if there has been a change in the contributing region or regions of the input surface or surfaces since the previous version of the region in the output surface was generated, regenerate the region of the output surface,
wherein:
  there are two or more input surfaces;
  the processing circuitry is configured to:
    determine which region or regions of the input surface or surfaces contribute to the region of the output surface; and
    check whether the contributing region or regions of the input surface or surfaces have changed since the previous version of the output surface region was generated;
  for each input surface, the processing circuitry is configured to:
  regenerate the region of the output surface if there has been a change in the contributing region or regions of any of the input surfaces since the previous version of the output surface was generated,
  the data processing system is a compositing window system, and the input surfaces each comprise respective input windows that are to be composited into an output window.

14. An apparatus as claimed in claim 13, wherein the processing circuitry is configured to:
  determine which region or regions of the input surface or surfaces contribute to the region of the output surface;
  check whether the contributing region or regions of the input surface or surfaces have changed since the previous version of the output surface region was generated; and
  if there has been a change in the contributing region or regions of the input surface or surfaces since the previous version of the region in the output surface was generated, regenerate the region of the output surface;
for each region of the output surface.

15. An apparatus as claimed in claim 13, wherein the processing circuitry determining which region or regions of the input surface or surfaces contribute to the region of the output surface includes determining which region or regions of an input surface will be visible in the output surface region.

16. An apparatus as claimed in claim 13, wherein the processing circuitry is configured to determine which region or regions of the input surface or surfaces contribute to a region of the output surface based on the process that is to be used to generate the output surface from the input surface or surfaces.

17. An apparatus as claimed in claim 13, wherein the processing circuitry is configured to determine which region or regions of the input surface or surfaces contribute to a region of the output surface based on a stored record indicating which region or regions of the input surface or surfaces contribute to the region of the output surface.

18. An apparatus as claimed in claim 13, wherein the processing circuitry is configured to check whether the contributing region or regions of the input surface or surfaces have changed since the previous version of the output surface region was generated by checking whether a signature or signatures representing the content of the contributing input surface region or regions have changed since the previous version of the output surface region was generated.

19. An apparatus as claimed in claim 13, wherein the processing circuitry is configured to, if the number of input surface regions that contribute to the output surface region exceeds a threshold number, check whether the contributing region or regions of the input surface or surfaces have changed since the previous version of the output surface region was generated by checking whether a signature or signatures representing the content of the contributing input surface or surfaces have changed since the previous version of the output surface region was generated.

20. An apparatus as claimed in claim 13, wherein the processing circuitry is configured to, if the number of input surface regions that contribute to the output surface region exceeds a threshold number, regenerate the region of the output surface without checking whether the contributing region or regions of the input surface or surfaces have changed since the previous version of the output surface region was generated.

21. An apparatus as claimed in claim 13, wherein the processing circuitry is configured to:
when a new version of the output surface is to be generated, first determine if any of the input surfaces that are to be used to generate the output surface have been transformed since the previous version of the output surface was generated;
and to:
if any of the input surfaces that will be used to generate the output surface has been transformed since the previous version of the output surface was generated, regenerate all of the regions of the output surface; or
if none of the input surfaces that will be used to generate the output surface has been transformed since the previous version of the output surface was generated, for at least one region of the output surface:
determine which region or regions of the input surface or surfaces contribute to the region of the output surface;
check whether the contributing region or regions of the input surface or surfaces have changed since the previous version of the output surface region was generated; and
if there has been a change in the contributing region or regions of the input surface or surfaces since the previous version of the region in the output surface was generated, regenerate the region of the output surface.

22. A non-transitory, computer readable storage medium storing computer software code which, when executed on a processor, performs a method of generating an output surface from one or more input surfaces in a data processing system, the method comprising:
generating the output surface as a plurality of respective regions that together form the output surface, each respective region of the output surface being generated from a respective region or regions of one or more input surfaces; and
when a new version of the output surface is to be generated, for at least one region of the output surface:
(i) determining which region or regions of the input surface or surfaces contribute to the region of the output surface;
(ii) checking whether the contributing region or regions of the input surface or surfaces have changed since the previous version of the output surface region was generated; and
(iii) if there has been a change in the contributing region or regions of the input surface or surfaces since the previous version of the region in the output surface was generated, regenerating the region of the output surface,
wherein there are two or more input surfaces and the method comprises performing steps (i) and (ii) for each input surface, and if there has been a change in the contributing region or regions of any of the input surfaces since the previous version of the output surface region was generated, regenerating the region of the output surface, and
wherein the data processing system is a compositing window system, and the input surfaces each comprise respective input windows that are to be composited into an output window.

* * * * *